E. C. BOOTH.
CORN POPPING MACHINE.
APPLICATION FILED MAR. 6, 1919.

1,332,023.

Patented Feb. 24, 1920.
3 SHEETS—SHEET 1.

INVENTOR.
EARL C. BOOTH.
BY
ATTORNEYS

E. C. BOOTH.
CORN POPPING MACHINE.
APPLICATION FILED MAR. 6, 1919.

1,332,023.

Patented Feb. 24, 1920.
3 SHEETS—SHEET 2.

INVENTOR.
EARL C. BOOTH.
BY
Lockwood & Lockwood
ATTORNEYS

E. C. BOOTH.
CORN POPPING MACHINE.
APPLICATION FILED MAR. 6, 1919.

1,332,023.

Patented Feb. 24, 1920.
3 SHEETS—SHEET 3.

INVENTOR.
EARL C. BOOTH.

BY
Lockwood Lockwood
ATTORNEYS

UNITED STATES PATENT OFFICE.

EARL C. BOOTH, OF INDIANAPOLIS, INDIANA, ASSIGNOR TO HOLCOMB & HOKE MANUFACTURING COMPANY, OF INDIANAPOLIS, INDIANA, A CORPORATION.

CORN-POPPING MACHINE.

1,332,023.  Specification of Letters Patent.  Patented Feb. 24, 1920.

Application filed March 6, 1919. Serial No. 280,971.

*To all whom it may concern:*

Be it known that I, EARL C. BOOTH, a citizen of the United States, and a resident of Indianapolis, county of Marion, and State of Indiana, have invented a certain new and useful Corn-Popping Machine; and I do hereby declare that the following is a full, clear, and exact description thereof, reference being had to the accompanying drawings, in which like numerals refer to like parts.

This invention relates to new and useful improvements in corn popping machines and one of the chief features of the invention is the provision of a heating element for popping the corn, and coöperating therewith are stirring bars for agitating the corn during the popping operation.

A further feature of the invention is the provision of pneumatic means causing suction for removing the popped grains from the heating element as rapidly as they are popped.

A further feature of the invention is the provision of means for removing the popped grains from the pneumatic means and discharging the same upon a buttering plate.

A further feature of the invention is the provision of means for oscillating and intermittently rotating the bars employed for stirring the corn as it is being popped.

A further feature of the invention is the provision of means for rotating the buttering plate whereby the corn will be thrown therefrom by centrifugal force.

Other objects and advantage will be hereinafter more fully set forth in the accompanying specification.

Figure 1:
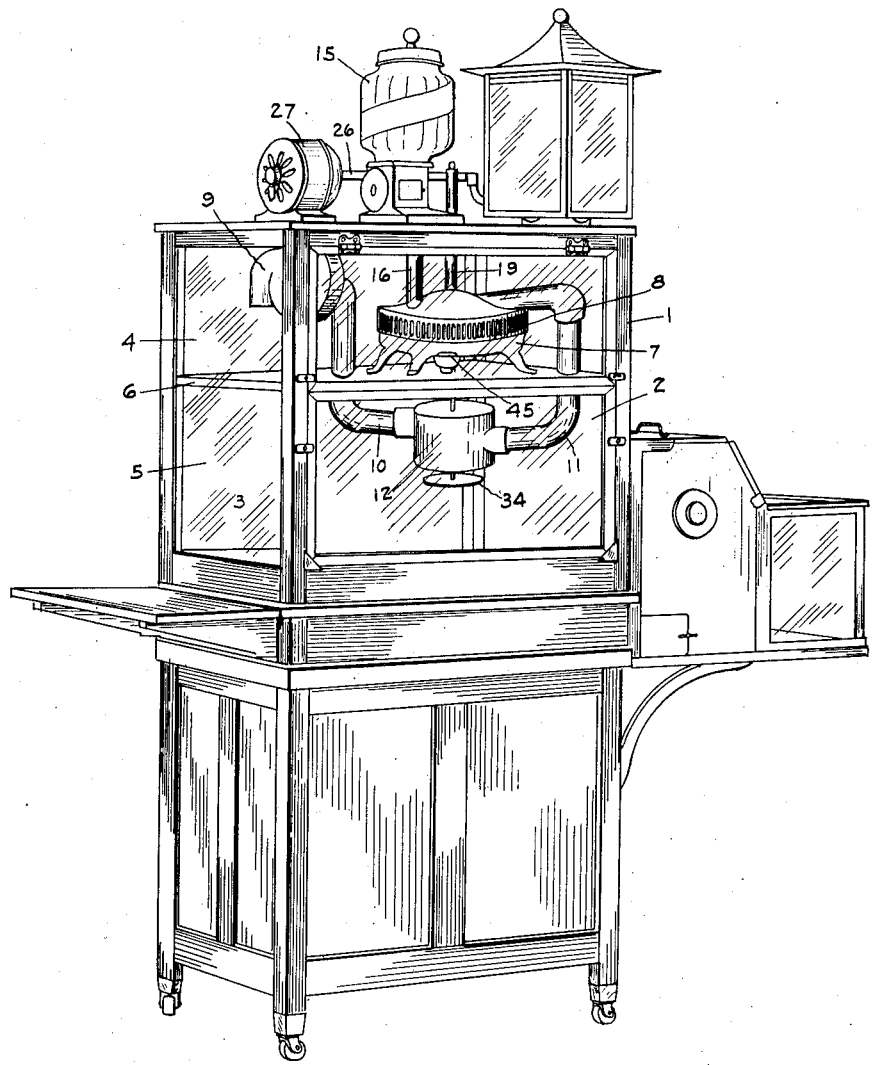
Figure 2:
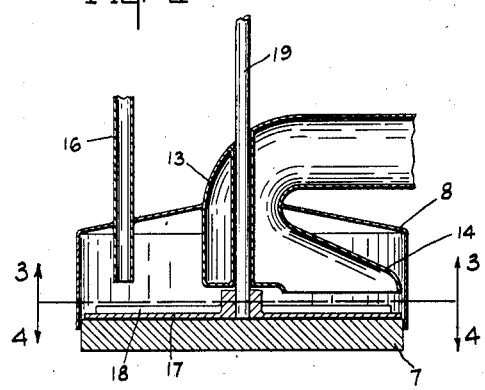
Figure 4:
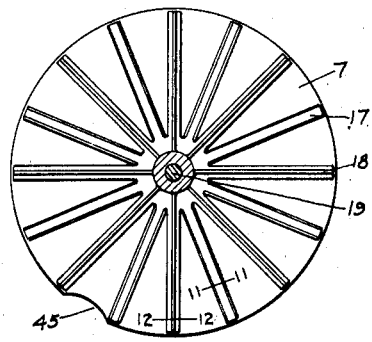
Figure 3:
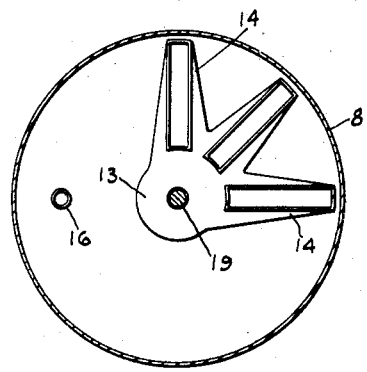
Figure 6:
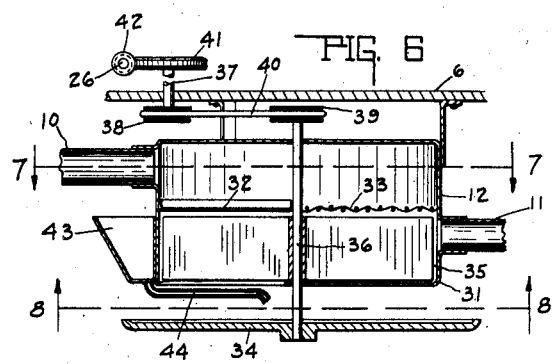
Figure 8:
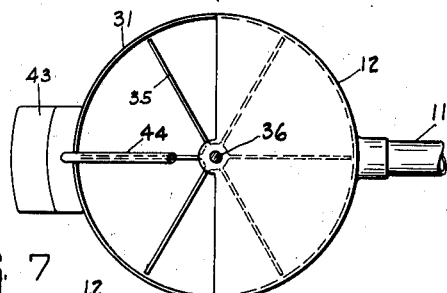
Figure 5:
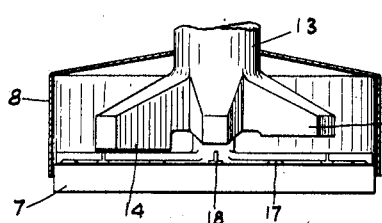
Figure 7:
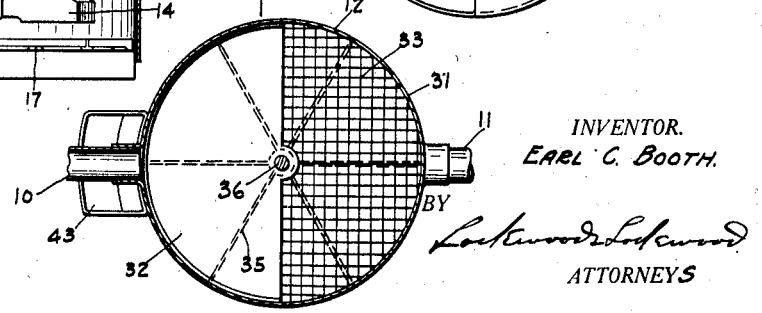
Figure 9:
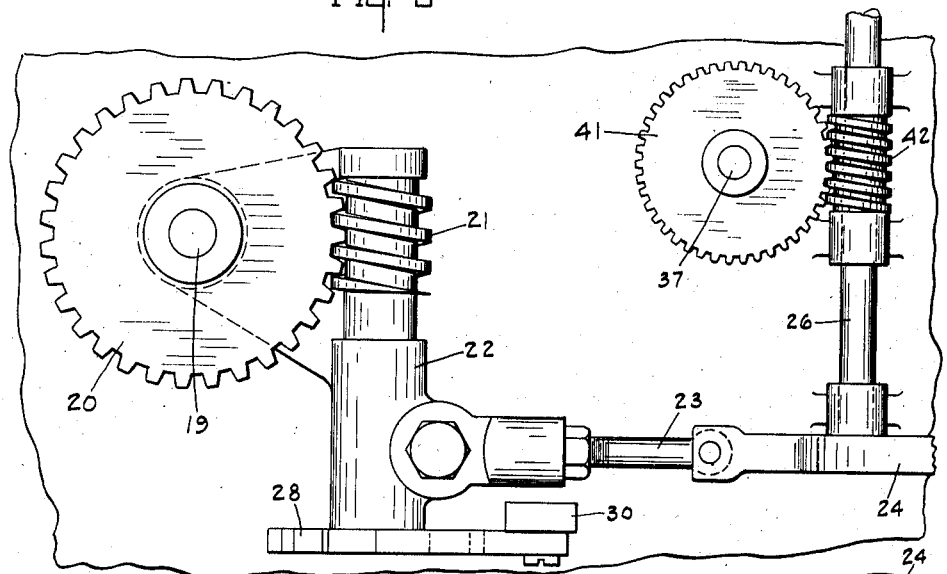
Figure 10:
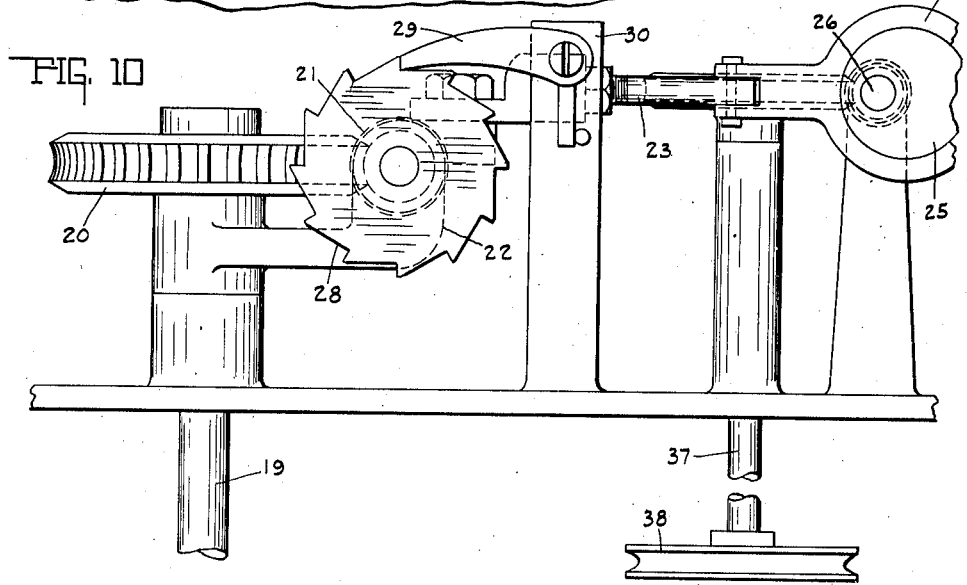
Figure 11:
Figure 12:
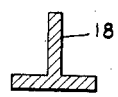

In the accompanying drawings, which are made a part of this application, Figure 1 is a perspective view of the machine complete. Fig. 2 is an enlarged sectional view through the popping compartment. Fig. 3 is a sectional view as seen on line 3—3 Fig. 2. Fig. 4 is a sectional view on the same line as 3—3 looking downward. Fig. 5 is a front elevation of the head through which the popped corn is removed from the heating element. Fig. 6 is a vertical, central, sectional view through the separating chamber where the popped corn is separated from the influence of the pneumatic means. Fig. 7 is a sectional view as seen on line 7—7 Fig. 6. Fig. 8 is a sectional view as seen on line 8—8 Fig. 6. Fig. 9 is a top plan view showing the mechanism for rotating and oscillating the grain stirring means. Fig. 10 is a side elevation thereof. Fig. 11 is an enlarged sectional view as seen on line 11—11 Fig. 4. Fig. 12 is an enlarged sectional view as seen on line 12—12 Fig. 4.

Referring to the drawings, in which similar reference numerals represent corresponding parts throughout the several views, 1 indicates a cabinet, the upper portion of which is provided with panels of glass 2 and 3, the said upper portion being divided into compartments 4 and 5 by means of a partition 6. The panels of glass 2 and 3 are arranged so that access may be had to the interior of the compartments 4 and 5.

Mounted upon the partition 6 in the compartment 4 is a heating element such as a hot plate 7 which may be heated in any preferred manner and surrounding said hot plate and forming a cavity thereover, is a frame 8 to prevent the grain from leaving the edges of the hot plate before and after it is popped.

Heretofore in poppers of this class, automatic means has been provided for removing the popped corn from the hot plate, but in the present device, pneumatic means is employed for that purpose, which consists of a suction fan structure 9, preferably suspended from the roof of the cabinet, although it may be mounted at any suitable point in the cabinet. Extended from the fan 9 to the top portion of the frame 8, are sections 10 and 11 of a suction tube, the section 10 having one of its ends communicating with the suction fan and the opposite end extending through the partition 6 and entering a separating compartment 12 at the upper edge thereof, while the section 11 extends from the top portion of the frame 8 to the lower edge of the separating compartment 12 and on the opposite side thereof from the section 10.

The upper end of the section 11 terminates in a hollow head 13 which extends into the cavity formed by the frame 8, the head having radiating hollow fingers 14 which project over a portion of the face of the hot plate 7, and as the corn is moved in a circular path in one direction over the hot plate, the finger first encountered by the corn is a greater distance above the hot plate than the next succeeding finger, and likewise the second finger is placed a greater distance from the hot plate than the next succeeding finger so that substantially every particle of the popped corn will be removed from the hot plate by the suction created by the fan 9. The corn is gradually fed upon the hot plate from a receptacle 15, preferably mounted above the cabinet, and the corn is conveyed to the hot plate through a spout 16. The corn after being deposited on the hot plate is continuously stirred by a plurality of stirring bars 17 and said corn is moved in a circular path over the face of the hot plate by bars 18, the stirring bars 17 being arranged alternately with the corn moving bars 18. The stirring bars 17 are preferably flat and have their edges beveled so that the bars will readily pass beneath the grains and lift them from the hot plate as the bars pass thereunder, while the bars 18 are substantially inverted T-shaped in cross section so as to readily move the grains over the face of the hot plate in a circular path.

The bars 17 and 18 are oscillated back and forth so as to constantly move the grains of corn, by attaching the bars to a shaft 19, which shaft projects upwardly through the top of the cabinet 1 and has a worm gear 20 fixed to the upper end thereof, with which coöperates a worm 21 rotatably mounted in a bearing 22, which bearing is pivoted to the shaft 19 at a point below the gear 20. The bearing 22 is swung in the arc of a circle through the medium of a pitman 23, one end of which is pivoted to the bearing 22 while the opposite end thereof is provided with an eccentric ring 24 which engages an eccentric 25 carried by the driving shaft 26 connected to a motor 27.

The shaft 19 and the bars 17 and 18 attached thereto, are also intermittently rotated as well as oscillated, this being accomplished by placing on the end of the worm 21 a ratchet 28 with which coöperates a pawl 29 pivoted upon a standard 30. By this construction it will be seen that when the bearing 22 is operated by the pitman 23 for swinging the bearing in the arc of a circle, the ratchet 28 will be carried with the worm, and when the bearing returns to its initial position, one of the teeth on the ratchet will engage with the pawl 29 and partially rotate the worm, thus partially rotating the shaft 19 and the stirring bars attached thereto.

The separating compartment 12 consists of a casing 31 in which is placed a horizontal partition 32, one half of said partition being solid and the remaining portion thereof formed of mesh wire 33, the mesh wire portion being positioned immediately over the end of the section 11 of the pipe which enters the casing 31, while the end of the section 10 enters the opposite side of the casing and above the solid portion of the partition. Consequently when the corn is sucked into the lower portion of the separating compartment, the air passes upwardly through the mesh wire and on into the section 10 of the suction pipe, while the corn remains in the lower portion of the compartment 12. That portion of the bottom wall of the casing 31 immediately below the solid portion of the partition 32 is removed, thus leaving an opening through which the popped corn descends upon a buttering plate 34, the corn being carried from the end of the pipe section 11 by means of blades 35, which blades are attached to a shaft 36 extending centrally through the casing. The shaft 36 and the blades 35 attached thereto, are rotated in any suitable manner, as by extending a shaft 37 downwardly from the driving shaft 26 and placing pulleys 38 and 39 on the ends of the shafts 37 and 36 respectively, which are connected by a belt 40, the upper end of the shaft 37 having a gear 41 which meshes with a worm 42 on the shaft 26. The shaft 36 also rotates the buttering plate 34, which is attached to the lower end of said shaft. A butter box 43 is mounted upon the casing 31, and has a spout 44 through which the butter is conveyed to the plate 34. As the popped corn descends upon the plate 34 it is thrown therefrom by the centrifugal force of the rotating plate and necessarily the corn comes in contact with the molten butter upon the plate, which adheres to the corn and properly seasons the same.

Applicant's manner of separating the corn from the air passing through the suction pipes also separates the fine particles of cob or the scales from the corn itself from the corn, carrying the same out with the air, thus leaving the corn absolutely pure.

It will also be noted that by providing an opening 45 in the hot plate 7, the inferior and unpopped grains will pass through said opening and leave the hot plate, said heavier grains being gradually moved to the periphery of the hot plate by the action of the stirring bars. This opening is necessarily positioned so that the popped corn will pass below the fingers 14 of the head 13 and be removed from the hot plate before the unpopped grains reach the opening 45, consequently none of the popped grains will leave the hot plate through said opening.

In operating the device, a quantity of corn to be popped is placed in the receptacle 15 and power applied to the motor 27, which operates a mechanism in the receptacle to slowly feed the grains of corn through the spout 16 on to the hot plate 7, and as the fingers 14 are positioned over the hot plate at a point diametrically opposite the discharge end of the spout 16, all of the grains of corn subject to being popped, will be popped before they reach the suction fingers.

As the corn passes below the fingers 14, the popped corn will be sucked up into said fingers by the pneumatic action set up by the fan and carried into the separating compartment, while the unpopped grains will be carried on by the bars 17 and 18 and will pass out through the opening 45 when they have been moved into registration with said opening. The popped corn after leaving the hot plate, enters the lower portion of the separating compartment 12 below the partition 32. The air passing upwardly through the section of mesh wire 33, and also such light foreign particles as may be in the corn, are carried on through the section 10 of the pipe into the fan 9, whence they are discharged at any suitable point. The corn in the lower portion of the separating compartment is carried to the opposite side of the compartment from the point where the section 11 of the suction pipe enters and descends through the opening in the bottom wall of the compartment, and on to the buttering plate 34. The corn is properly buttered by coming in contact with a coating of melted butter which is constantly supplied to the buttering plate from the box 43, the rotation of the plate 34 causing the corn to leave the plate and descend into the compartment 5.

The invention claimed is:

1. In a corn popping device the combination with a heating element for popping grains of corn, pneumatic means for removing the popped grains of corn from the heating element by suction, and means for separating the popped grains of corn from the pneumatic means, of a horizontally disposed buttering plate, means for depositing the popped grains of corn upon the buttering plate, means for constantly depositing a supply of butter on said plate, and means for rotating said separating means and said buttering plate.

2. A corn popping device including a stationary heating element, means for depositing grains of corn upon the heating element to be popped, means for creating a suction for removing the popped grains from the heating element, and means for agitating said grains during the popping operation.

3. A corn popping device including the combination of a flat, stationary heating element adapted to pop corn grains deposited thereon, means for constantly stirring and intermittently moving in one direction over the face of said heating element a volume of corn, and pneumatic means for removing the popped grains of corn from the heating element, said heating element having an aperture therein whereby the unpopped grains of corn are removed from the heating element by said stirring and removing means.

4. In a corn popping device the combination of a heating element adapted to pop grains of corn deposited thereon and having an aperture therein, pneumatic suction means for removing the popped grains of corn, and rotatable means for removing through said aperture the unpopped grains of corn.

5. A corn popping device including a stationary heating element adapted to pop grains of corn deposited thereon, pneumatic means for removing the popped grains of corn from the heating element by suction, means for separating the popped corn from the influence of the pneumatic means, a buttering plate, and means for depositing the popped grains of corn upon the buttering plate.

6. In a corn popping device, the combination with a stationary heating element adapted to pop grains of corn, and pneumatic means for removing the popped corn from the heating element by suction, of means for applying butter to the popped grains of corn after leaving the heating element.

7. In a corn popping device, the combination with a heating element adapted to pop grains of corn, and pneumatic means for removing the popped grains from the heating element by suction, of a buttering plate, means for depositing the popped grains of corn upon said plate, means for rotating said buttering plate, and means for constantly replenishing the supply of butter on the buttering plate.

8. In a corn popping device the combination with a heating element adapted to pop grains of corn deposited thereon, of a hollow head above said heating element, a plurality of hollow fingers extending from said head and positioned over the heating element, and pneumatic means for removing the popped grains of corn from the heating element through said fingers and head.

9. In a corn popping device a heating element adapted to pop grains of corn deposited thereon, a hollow head suspended above said heating element, hollow fingers radiating from the head, each succeeding finger from a given point being relatively nearer the face of the heating element than the preceding finger, and means for creating a suction through said head and fingers for removing the popped grains of corn from the heating element.

In witness whereof, I have hereunto affixed my signature.

EARL C. BOOTH.

Witness:
DALE WELCH.